(12) United States Patent
Roussel et al.

(10) Patent No.: US 8,514,660 B2
(45) Date of Patent: Aug. 20, 2013

(54) RANGE SENSOR OPTIMIZED FOR WIND SPEED

(75) Inventors: Stephane M. Roussel, San Jose, CA (US); Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 358 days.

(21) Appl. No.: 12/869,640

(22) Filed: Aug. 26, 2010

(65) Prior Publication Data
US 2012/0051183 A1 Mar. 1, 2012

(51) Int. Cl.
*G01S 15/00* (2006.01)
*G01S 15/58* (2006.01)

(52) U.S. Cl.
CPC ................ *G01S 15/582* (2013.01)
USPC .................................................. 367/89

(58) Field of Classification Search
USPC .................................................. 367/89
See application file for complete search history.

(56) References Cited

U.S. PATENT DOCUMENTS

| 7,327,637 B2* | 2/2008 | Chambers et al. | 367/140 |
|---|---|---|---|
| 7,391,676 B2 | 6/2008 | Bruinsma et al. | |
| 2002/0021056 A1* | 2/2002 | Amaike et al. | 310/324 |
| 2004/0252586 A1* | 12/2004 | Martin | 367/89 |
| 2005/0152218 A1* | 7/2005 | Shim | 367/1 |
| 2005/0232082 A1* | 10/2005 | Martin | 367/129 |
| 2005/0249035 A1* | 11/2005 | Chiappetta et al. | 367/98 |
| 2006/0236777 A1* | 10/2006 | Chambers et al. | 73/801 |
| 2007/0067067 A1* | 3/2007 | Stommel | 700/287 |
| 2007/0089502 A1* | 4/2007 | Martin | 73/170.13 |
| 2008/0037811 A1* | 2/2008 | Gustavsson | 381/317 |
| 2008/0079263 A1* | 4/2008 | Morjaria et al. | 290/44 |
| 2009/0022589 A1* | 1/2009 | Sorensen | 416/41 |
| 2009/0049905 A1* | 2/2009 | LaWhite et al. | 73/170.13 |
| 2009/0281711 A1* | 11/2009 | Ueno | 701/104 |
| 2009/0311097 A1* | 12/2009 | Pierce et al. | 416/42 |
| 2010/0052320 A1* | 3/2010 | Hoffmann | 290/44 |

FOREIGN PATENT DOCUMENTS

| JP | 05035332 A | 2/1993 |
|---|---|---|
| JP | 08211149 A | 8/1996 |
| JP | 2006179902 A | 7/2006 |
| KR | 7071203 A | 7/2007 |

* cited by examiner

*Primary Examiner* — Isam Alsomiri
*Assistant Examiner* — James Hulka
(74) *Attorney, Agent, or Firm* — Gifford, Krass, Sprinkle, Anderson & Citkowski, P.C.

(57) ABSTRACT

A sonar system having an acoustic wave range sensor which may be displaceable so as to reduce noise is provided. The sonar system further includes a wind sensor operable to detect wind velocity, an actuator coupled to the acoustic wave range sensor, and a processor. The actuator is coupled to the acoustic wave range sensor and operable to change the position of the acoustic wave range sensor. The processor is operable to process the wind velocity, determine the effect the wind has on the echo, and actuate the actuator so as to adjust the position of the acoustic wave range sensor to a position wherein the performance of the acoustic wave range sensor is optimized under dynamic wind conditions.

11 Claims, 4 Drawing Sheets

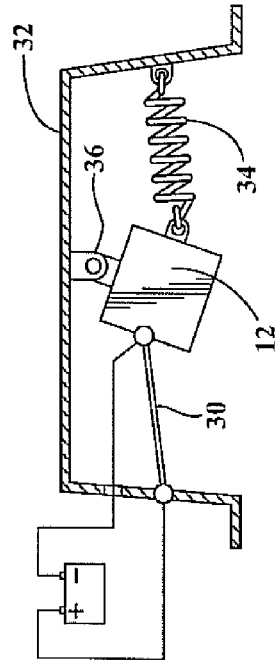
FIG. 8A
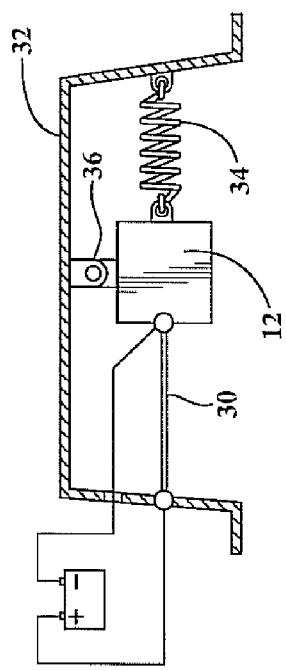
FIG. 8B
| Wind Direction (0 degrees is tangential) | Wind Speed (mph) | | | | | |
|---|---|---|---|---|---|---|
| | 10 | 15 | 20 | 25 | 30 |
| 0 | 5 | 10 | 15 | 20 | 25 |
| 10 | 7 | 12 | 17 | 22 | 27 |
| 20 | 10 | 15 | 20 | 25 | 30 |
| 30 | 15 | 20 | 25 | 30 | 35 |
| 40 | 22 | 27 | 32 | 37 | 42 |
| 50 | 30 | 35 | 40 | 45 | 45 |
FIG. 9

RANGE SENSOR OPTIMIZED FOR WIND SPEED

FIELD OF THE INVENTION

The invention relates to a sonar system. More specifically, the invention relates to a sonar system having an acoustic wave range sensor and an actuator coupled to the acoustic wave range sensor. The actuator is operable to change the position of the acoustic wave range sensor so as to minimize the effect of wind on the accuracy of said range sensor.

BACKGROUND OF THE INVENTION

Sonar systems are used for detecting the range of an object. Such systems emit an acoustic wave which travels through the air and is known to be affected by wind. Thus the accuracy of sonar systems may be reduced during high wind conditions.

The acoustic wave sensor includes a transmitter and a receiver. The transmitter sends a pulse of sound often referred to in the art as a ping. The ping travels through the air until it hits an object. The receiver listens for the reflection of the ping from the object, also referenced in the art as an echo. The distance to an object is measured by processing the time of the transmission of a ping to the reception of an echo. However, since the pulse and the echo are transmitted through the air, the time that the pulse takes to get to an object and the time the echo takes to get to the receiver may be influenced by such factors as wind speed, humidity, air temperature and the like.

It is known to surround the sensors with shields so as to mitigate the effect of wind on the performance of these sensors. However, the use of shields places a static barrier over the sensor and thus does not account for dynamic properties such as changing speed and direction of the wind.

Accordingly, it remains desirable to have a sonar system which may be optimized so as to reduce the effect of wind on the performance of the sensor in a dynamic environment.

SUMMARY OF THE INVENTION

According to one aspect of the invention, a sonar system includes an acoustic wave range sensor, a wind sensor operable to detect the wind speed, an actuator coupled to the acoustic wave range sensor, and a processor. The actuator is coupled to the acoustic wave range sensor and operable to change the position of the acoustic wave range sensor. The processor is operable to process the wind speed, determine the effect the wind speed has on the echo, and actuate the actuator so as to adjust the position of the acoustic wave range sensor to a position wherein the performance of the acoustic wave range sensor is optimized under dynamic wind conditions.

According to another embodiment of the invention, a sonar system mounted on an automotive vehicle includes an acoustic wave range sensor, a wind sensor, an actuator, and a processor. The acoustic wave range sensor is mounted on each side of the automotive vehicle. The wind sensor is operable to detect the wind speed. The actuator is coupled to the acoustic wave range sensor and is operable to change the position of the acoustic wave range sensor. The processor is operable to process the wind speed, determine the effect the wind speed has on the echo, and actuate the actuator so as to adjust the position of the acoustic wave range sensor to a position wherein the effect of wind is mitigated.

BRIEF DESCRIPTION OF THE DRAWINGS

Advantages of the present invention will be readily appreciated as the same becomes better understood by reference to the following detailed description when considered in connection with the accompany drawings wherein:

FIG. 8a is a perspective view of a sonar system having a shape memory alloy operable to change the position of the acoustic wave range sensor;

FIG. 8b is a perspective view of FIG. 8a wherein the shape memory alloy is actuated;

FIG. 9 is a chart.

DETAILED DESCRIPTION OF THE INVENTION

Figure 1:
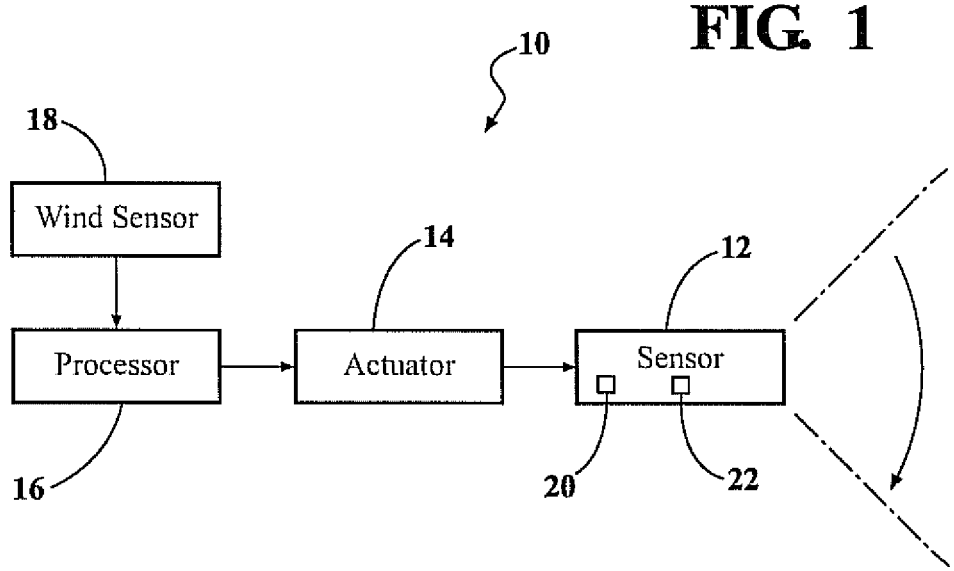
FIG. 1 is a diagram of a sonar system.

With reference first to FIG. 1, a diagram of a sonar system 10 is provided. The sonar system 10 includes an acoustic wave range sensor 12, an actuator 14, a processor 16, and a wind sensor 18. The acoustic wave range sensor 12 includes a transmitter 20 and a receiver 22.

The transmitter 20 is operable to transmit an acoustic wave in the form of a pulse referenced by those skilled in the art as a ping. The receiver 22 listens for reflections of the pulse/ping bouncing off an object, also referenced by those skilled in the art as an echo. The sensor transmits the time of the pulse and the time of the echo to the processor 16. The processor 16 converts the measured time into a range.

The operation of an acoustic wave range sensor 12 is known to those skilled in the art. For example, the acoustic wave range sensor 12 may be operable to send a pulse for 1 millisecond and pause for 80 milliseconds before sending another pulse. During the pause, echoes are received and processed to determine the distance of the detected object. Preferably, the acoustic wave range sensor 12 is operable to transmit an acoustic waveform having a frequency between 30 kilohertz and 5 megahertz.

This is example is provided for illustrative purposes only, and is in no way limiting to the operation of the acoustic wave range sensor 12 described herein. For example, the acoustic wave range sensor 12 may determine an objects distance in other ways, such as frequency modulated continuous wave, or amplitude modulated continuous wave.

The wind sensor 18 is operable to detect the speed of the wind. The wind sensor 18 is in communication with the processor 16 and transmits the wind speed to the processor 16. Any wind sensor 18 currently known and used in the art may be adoptable for use herein, illustratively including an anemometer or a pilot tube.

The processor 16 processes the wind speed to determine the effect the wind speed has on the echo. The processor 16 then actuates the actuator 14 so as to adjust the position of the acoustic wave range sensor 12 to a position wherein the effect of wind on the sonar system 10 is minimized. In other words, the acoustic wave range sensor 12 is positioned so as to optimize the accuracy of the sonar system 10.

Figure 2:
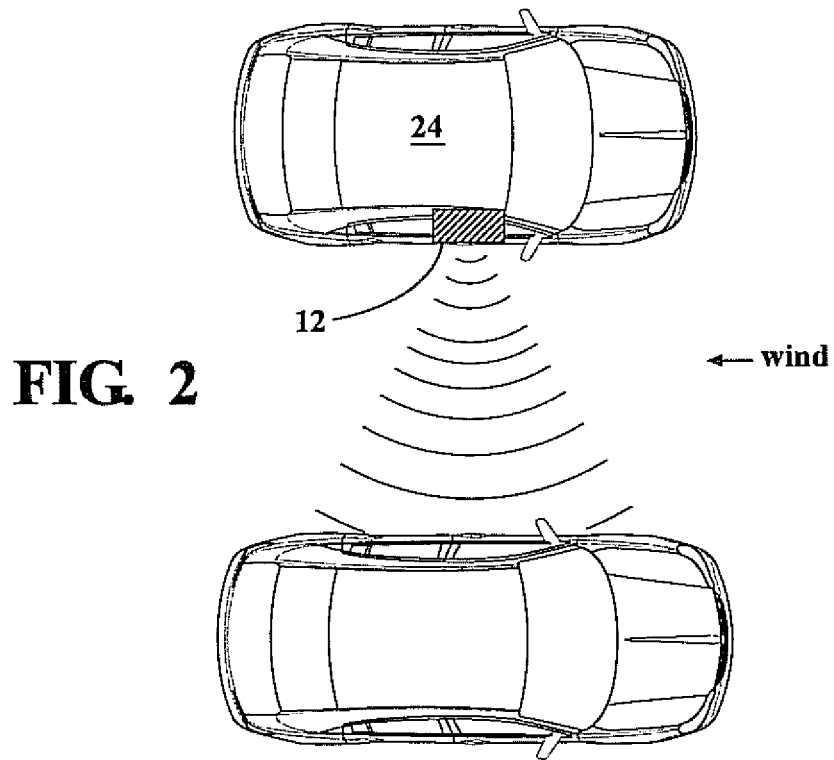
FIG. 2 is a perspective view of an automotive vehicle having a sonar system and showing the magnitude and direction of wind speed.

With reference now to FIG. 2, the sonar system 10 may be used on a platform such as an automotive vehicle 24. The sonar system 10 is operable to detect objects within a predetermined range of the automotive vehicle 24. Preferably, the sonar system 10 is operable to detect objects within a six meter radius of the acoustic wave range sensor 12. FIG. 2 shows the direction of the automotive vehicle 24, the direction of the wind, and the orientation of the target with respect to the automotive vehicle 24. The magnitude of the wind speed is indicated by a single arrow and is in this case has negligible influence on the wind sensor 18. Thus, there is no need to move the acoustic wave range sensor 12 from its position with respect to the side of the vehicle.

Figure 3:
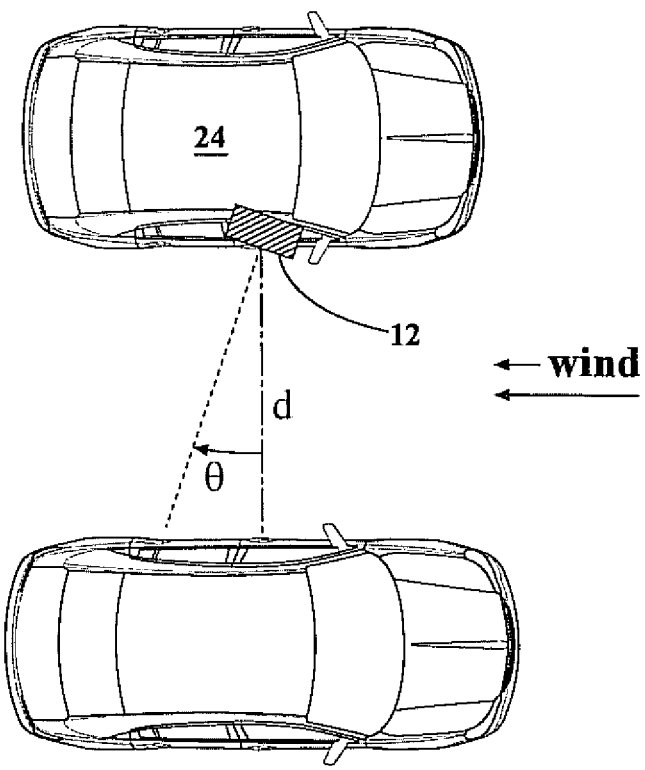
FIG. 3 is a perspective view of FIG. 2 showing an increased wind speed and the change of position of the acoustic wave range sensor.
Figure 4:
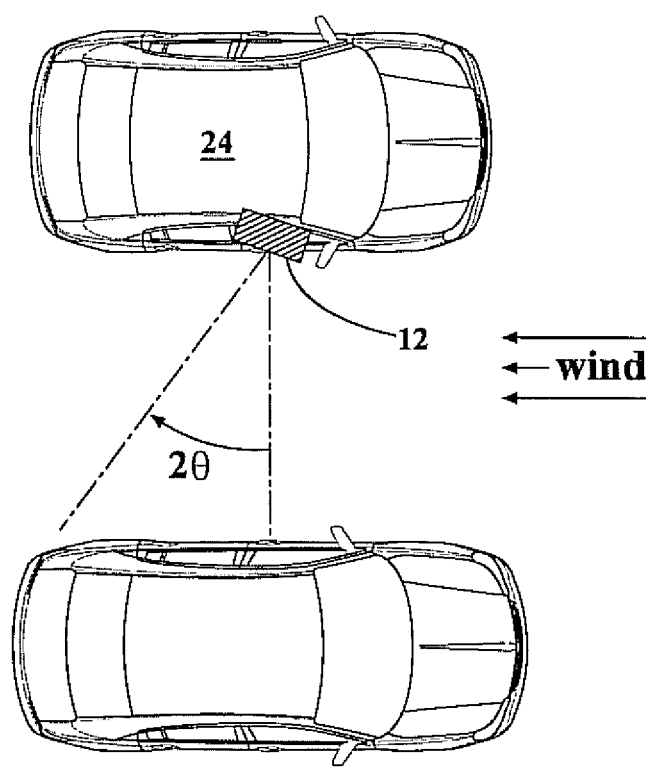
FIG. 4 shows the acoustic wave range sensor tilted even more so than the range sensor in FIG. 3 as a result of an increase in wind speed.

FIG. 3 shows an increase in wind magnitude (as indicated by the additional arrow) and the wind speed is processed by the processor 16 so as to determine the effect the wind speed has on the pulse and the echo. The processor 16 then adjusts the acoustic wave range sensor 12 so as to mitigate the effect of the wind. For illustrative purposes the processor 16 is shown adjusting the angle of the range sensor with respect to the vehicle by angle θ. With reference now to FIG. 4, the wind speed is increased (as indicated by the additional arrow) and thus the processor 16 adjusts the position of the acoustic wave range sensor 12 so as to rotate the wave range sensor by angle 2θ.

Figure 5:
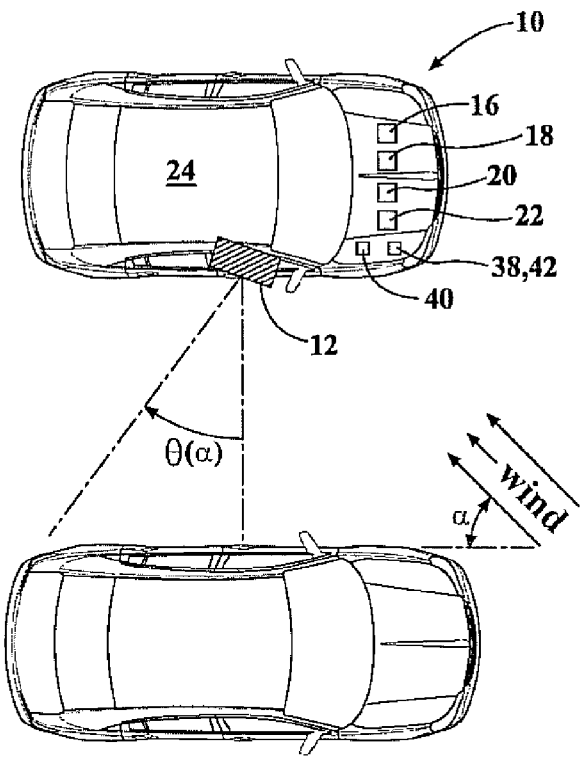
FIG. 5 is a perspective view of FIG. 4 showing a change in wind direction and the sensor being positioned so as to optimize the performance of the acoustic wave range sensor with the change in direction of the wind.

With reference now to FIG. 5, the sonar system 10 is further operable to account for the direction of the wind as well as the wind speed. FIG. 5 shows the wind coming at an angle relative to the side of the automotive vehicle 24 and the acoustic wave range sensor 12. The processor 16 processes the wind speed along with the angle of the wind so as to rotate the acoustic wave range sensor 12 angle θ(α) with respect to its mounted position. Wherein angle θ(α) is the angle of the acoustic wave range sensor 12 as a function of angle of the wind as indicated by α.

The processor 16 may take in further information to help adjust and determine the effect of the wind and help adjust the position of the acoustic wave range sensor 12 accordingly. For instance, the sonar system 10 may further consider the direction and the velocity of the host automotive vehicle 24. In such an embodiment, the processor 16 may be in communication with an instrument such as the vehicle's speedometer. Direction may be found utilizing technology such as the vehicle's GPS system. The speed and direction of the vehicle may be processed along with the wind speed and magnitude and direction of the wind to determine the effect that the vehicle's velocity and wind's velocity have on the ping and echo. The processor 16 then actuates the actuator 14 so as to position the acoustic wave range sensor 12 in a position wherein wind speed and vehicle speed and direction are minimized. Thus, the acoustic wave range sensor's 12 accuracy is optimized with respect to the current operating conditions.

Figure 6A:
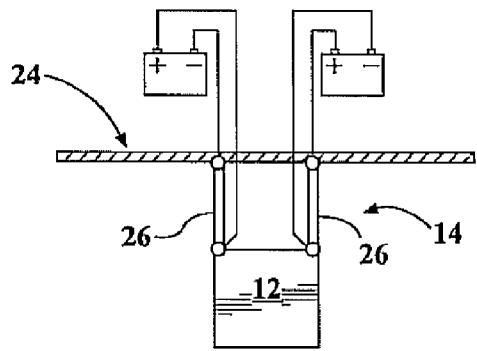
FIG. 6a is a perspective view of a sonar system having a piezoelectric memory device operable to change the position of the acoustic wave range sensor.
Figure 6B:
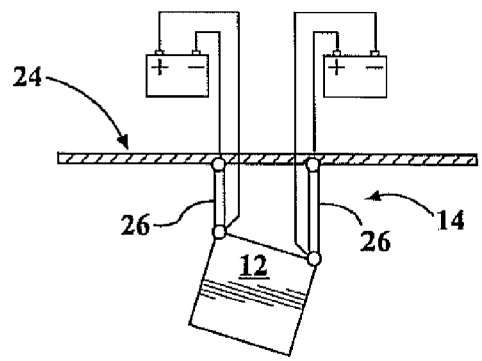
FIG. 6b is a perspective view of FIG. 6a wherein the piezoelectric memory device is actuated.
Figure 7:
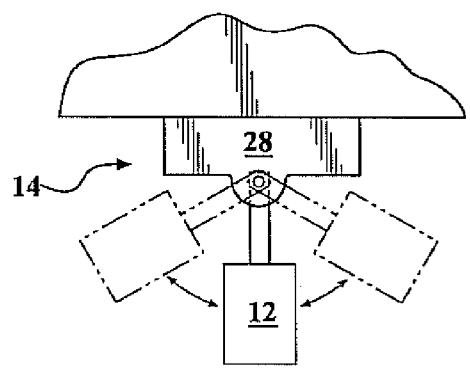
FIG. 7 is a perspective view of a sonar system having a servo motor operable to change the position of the acoustic wave range sensor.

With reference now to FIGS. 6-8, the actuator 14 may be a piezoelectric memory device 26, a servo motor 28, or a shape memory alloy 30. Any piezoelectric memory devices 26 currently known and used in the art may be adoptable for use herein. The piezoelectric memory device 26 is an elongated member operable to receive an electric signal and contract or expand in response to the electric signal provided.

An illustrative operation of the sonar system 10, having a piezoelectric memory device 26 is provided in FIGS. 6a and 6b. With reference first to FIG. 6a, a pair of piezoelectric memory devices 26 is coupled to respective ends of the acoustic wave range sensor 12. Each piezoelectric memory device 26 is equal in length to the other, and is fixedly mounted to the body of the host automotive vehicle 24. Each piezoelectric memory device 26 is coupled to a battery.

It should be appreciated by those skilled in the art that the respective piezoelectric memory devices 26 may be coupled to the same battery source. In such an embodiment the system 10 may further include voltage regulators (not shown) disposed between the battery and piezoelectric memory device 26. The regulators regulate the electric signal to respective piezoelectric memory device 26 so as to adjust the length of respective piezoelectric memory devices 26.

FIG. 6b shows an electric signal supplied to each of the piezoelectric memory devices 26, causing one device to expand and the other to contract. The angle of the acoustic wave range sensor 12. Thus, the processor 16 may be able to regulate electrical signals going into the piezoelectric memory device 26 so as to position the sensor in a manner operable to optimize the function and accuracy of the acoustic wave range sensor 12.

With reference now to FIG. 7, the processor 16 may be operable to send a signal to the servo motor 28 so as to rotate and position the acoustic wave range sensor 12 in a manner which optimizes the performance of the acoustic wave range sensor 12 under dynamic vehicle and wind conditions.

With reference now to FIGS. 8a and 8b, an illustrative operation of the sonar system 10, having an actuator 14 including a shape memory alloy 30 (SMA 30) is provided. The shape memory alloy 30 is disposed within a housing 32 and mechanically coupled to the acoustic wave range sensor 12. The housing 32 is mounted to the host automotive vehicle 24.

The SMA 30 is an elongated member formed from a material that contracts or expands from electrical or thermal stimulation. Such material is currently known and used and the art, and illustratively includes nickel-titanium alloy. The SMA 30 extends between a side wall of the housing 32 and the acoustic wave range sensor 12.

A biasing member 34, such as a spring is mechanically coupled to the other side of the acoustic wave range sensor 12. The actuator 14 further includes a cam 36 disposed between the acoustic wave range sensor 12 and the support surface of the housing 32.

With reference now to FIG. 8b, the operation of the sonar system 10 is provided. The wind sensor 18 transmits the magnitude of the wind to the processor 16. The processor 16 calculates the preferred angle the acoustic wave range sensor 12 should be positioned so as to reduce noise, or the effects of wind. An electric signal is transmitted to the SMA 30, and the SMA 30 contracts or expands so as to position the acoustic wave range sensor 12 at the calculated angle.

Determining the position of the wave range sensor with respect to the operating conditions of the wind and vehicle may be done other ways. For example, the system may include a lookup table 38 or a database 40. The database 40 is programmed with a plurality of wind speeds and the position of the acoustic wave range sensor 12 operable to minimize the effect of the wind under each of wind speeds.

With reference to FIG. 9, a chart 42 is provided showing the wind speed and the angle of rotation for the acoustic wave range sensor 12 wherein the acoustic wave range sensor 12 is mounted flush against the side of the vehicle. Thus, under 15 miles of wind coming at a general tangential direction of the sensor, the sensor should be angled 10 degrees so as to offset the effect of the wind. However, under 40 miles per hour of wind at a tangential direction, the acoustic wave range sensor 12 is rotated 30 degrees relative to the side of the vehicle. The database 40 may include other information such as the speed and direction of the car. Thus, the relative wind speed may be used to adjust the position of the sensor.

In a second preferred embodiment the processor 16 is operable to process a predetermined number of echoes within a predetermined period of time so as to determine a distance for each echo. The processor 16 is operable to determine if the distances within the predetermined period of time fall within a predetermined distance of each other. That is, the processor 16 is provided with a tolerance. If the distances determined within that predetermined period of time fall outside of the tolerance, then the processor 16 recognizes that the sensor is not performing in an optimal condition and thus adjusts the position of the range sensor relative to the vehicle until the processed distances fall within the tolerance.

For example, assume that the processor 16 collects 50 echoes within a 2 second time period and the distances calculated from each echo range between 3 to 6 meters. Further assume that the processor 16 is programmed with a tolerance of 0.5 meters. The processor 16 is operable to adjust the position of the acoustic wave range sensor 12 until the calculated distances for each echo fall within 0.5 meters of each other. As shown in FIG. 8, the actuator 14 is operable to angle the acoustic range sensor from 90 degrees of the automotive vehicle 24. Acoustic wave range sensors 12 are currently known and used in the art and include ultrasonic sensors 12, 18 operating at a frequency between 30 kilohertz to 5 megahertz.

The invention has been described in an illustrative manner. It is therefore to be understood that the terminology used is intended to be in the nature of words of description rather than limitation. Many modifications and variations of the invention are possible in light of the above teachings. For instance, the acoustic wave range sensor 12 may be coupled to a neural network adaptable to learn the optimal position of the acoustic wave range sensor 12 under a plurality of dynamic environmental conditions. In another example the sonar system 10 may be operable to extrapolate an optimal position of the acoustic wave range sensor 12 from the database 40 when the exact operating conditions are not present. Thus, within the scope of the appended claims the invention may be practiced other than as specifically described.

We claim:

1. A sonar system comprising:
   an acoustic wave range sensor having a transmitter and a receiver, the transmitter configured to send a pulse of sound, the receiver configured to detect an echo from the pulse of sound;
   a wind sensor configured to detect the wind speed;
   an actuator coupled to the acoustic wave range sensor and configured to change the position of the acoustic wave range sensor; and
   a processor configured to process the wind speed, determine the effect the wind speed has on the echo, the processor transmitting a signal to the the actuator so as to adjust the physical position of the acoustic wave range sensor to a position wherein the effect of wind is mitigated.

2. The sonar system as set forth in claim 1, wherein the actuator is a servo motor.

3. The sonar system as set forth in claim 1, wherein the actuator is a piezoelectric memory device.

4. The sonar system as set forth in claim 1, wherein the actuator is a shape memory alloy.

5. The sonar system as set forth in claim 1, further including a database programmed with a plurality of wind speeds and the position of the acoustic wave range sensor configured to minimize the effect of the wind.

6. The sonar system as set forth in claim 1, wherein the processor is further configured to process a predetermined number of echoes within a predetermined period of time so as to determine a distance for each echo, and wherein the processor is configured to actuate the actuator so as to adjust the position acoustic wave range sensor, until the distances fall within a predetermined tolerance of each other.

7. The sonar system as set forth in claim 1, wherein the acoustic wave range sensor transmits an acoustic waveform having a frequency between 30 kilohertz and 5 megahertz.

8. The sonar system as set forth in claim 1, wherein the actuator is configured to angle the acoustic range sensor ninety degrees.

9. An automotive vehicle having an sonar system configured to detect the range of an object, the sonar system comprising:
   an acoustic wave range sensor mounted on opposite sides of the automotive vehicle, each of the two opposing acoustic wave range sensor having a transmitter and a receiver, the transmitter configured to send a pulse of sound, the receiver configured to detect an echo from the pulse of sound;
   a wind sensor configured to detect the wind speed;
   an actuator coupled to the acoustic wave range sensor and configured to change the position of the acoustic wave range sensor; and
   a processor configured to process the wind speed, determine the effect the wind speed has on the echo, the processor transmitting a signal to the actuator so as to adjust the physical position of the acoustic wave range sensor to a position wherein the effect of wind is mitigated.

10. The sonar system as set forth in claim 9, wherein the actuator is configured to angle the acoustic range sensor ninety degrees from the side of the automotive vehicle.

11. The sonar system as set forth in claim 9, wherein the acoustic wave range sensor transmits an acoustic waveform having a frequency between 30 kilohertz and 5 megahertz.

* * * * *